US005104233A

United States Patent [19]

Kojima

[11] Patent Number: 5,104,233

[45] Date of Patent: Apr. 14, 1992

[54] MIXING ELEMENT WITH A TAPERED POROUS BODY

[76] Inventor: Hisao Kojima, 3-53-21, Shioiri-Cho, Tsurumi-ku, Yokohama-Shi, Kanagawa-ken, Japan

[21] Appl. No.: 531,621

[22] Filed: Jun. 1, 1990

Related U.S. Application Data

[62] Division of Ser. No. 219,993, Jul. 15, 1988, abandoned.

[30] Foreign Application Priority Data

Jul. 16, 1987 [JP] Japan ............................... 62-175935

[51] Int. Cl.[5] .......................... B01F 5/06; B01D 47/00

[52] U.S. Cl. ...................................... 366/339; 55/235; 55/456; 138/39; 138/41; 138/42

[58] Field of Search ................................ 366/336-340; 138/37, 38, 41, 40, 42, 44; 165/109.1, 174, 184; 137/808, 896; 431/354; 48/180.1, 189.3, 189.4, 189.6; 181/279, 280, 267; 55/92, 235, 456, 457

[56] References Cited

U.S. PATENT DOCUMENTS 735,192 8/1903 Allert ............................... 55/456 X
2,232,913 2/1941 Heuberger ........................ 55/457 X
3,775,063 11/1973 Grout et al. ........................ 55/92 X
3,813,854 6/1974 Hortman .......................... 55/457 X
3,861,652 1/1975 Clark ................................. 366/336
4,466,741 8/1984 Kojima .............................. 366/339
4,533,015 8/1985 Kojima .............................. 181/280
4,747,697 5/1988 Kojima .............................. 366/339
4,878,925 11/1989 Kojima ................................ 55/235
4,902,418 2/1990 Ziegler ........................... 366/337 X

FOREIGN PATENT DOCUMENTS 982549 1/1976 Canada ............................... 366/338

*Primary Examiner*—Philip R. Coe
*Assistant Examiner*—C. Cooley
*Attorney, Agent, or Firm*—Wenderoth, Lind & Ponack

[57] ABSTRACT

A mixing element according to this invention comprises a passage tube through which fluids to be mixed pass, a fluid structure providing a plurality of fluid passage in the interior of the passage tube, and an auxiliary body disposed on the inner wall surface of the passage tube and at least a part of the surface of the fluid passage structure, whereby the area in contact with the fluids and the shearing force are increased, whereby the mixing effect is improved.

16 Claims, 6 Drawing Sheets

MIXING ELEMENT WITH A TAPERED POROUS BODY

This application is a divisional application of Ser. No. 219,993, filed July 15, 1988, now abandoned.

BACK GROUND OF THE INVENTION

This invention relates to a mixing element for mixing at least two kinds of fluids, and to a motionless fluid mixer using the mixing element.

A motionless fluid mixer has a fluid passage structure without any mechanically movable parts disposed in a passage tube, and more than one kind of fluids are passed through the passage tube so as to mix the fluids. Motionless fluid mixers of this type are used in many fields, e.g., chemistry, foods, pollution preventive engineering, and electronics industries.

The conventional motionless fluid mixer for mixing two or more kinds of fluids comprises, for example, (i) mixing elements each having a plurality of curved sheet-like blades disposed in a hollow cylindrical tube serially in point-contact with one another, the mixing elements being connected to one another with the edges of adjacent blades of the mixing elements arranged orthogonal to each other (e.g., as described in Japanese Patent Publication No. 8290/1969), or (ii), as shown in FIG. 15, a plurality of mixing elements 51 each having a plurality of fluid passages 57, 58 formed by partitioning the interior of a cylindrical passage tube 53 with helical blades 55, the mixing elements being connected to one another with the adjacent edges of adjacent blades of the mixing forming a specified angle (e.g., as disclosed in Specification of U.S. Pat. No. 4,466,741).

However, the conventional motionless fluid mixer does not always produce a sufficient mixing effect. Especially in gas-liquid mixing, sufficient gas absorbing and mixing effects have not been produced. Furthermore, in collecting dust it has been very difficult to capture fine particles In mixing powders, sufficient mixing effect has not been obtained.

SUMMARY OF THE INVENTION

In view of the above described problems, this invention seeks to provide a mixing element and a motionless fluid mixer using the mixing element in which the structure of the mixer is simple and compact, and which improves the mixing effect for fluids, especially gas-liquid mixing, and is also usable for mixing powders.

The mixing element according to this invention comprises a passage tube through which fluids to be mixed are passed, and a fluid passage structure disposed in the passage tube and partitioning the interior of the passage tube into a plurality of fluid passages. Further, an auxiliary body is disposed on the inner wall surface of the passage tube and at least a part of the surface of the fluid passage structure, whereby the area of contact with the fluids and the shearing force on the fluids are increased, thereby improving the mixing effect.

According to this invention the motionless fluid mixer is fabricated by connecting a plurality of the mixing elements longitudinally of the passage tubes with the adjacent edges of adjacent blades of the mixing elements orientated orthogonally to each other.

The fluids which can be mixed by the motionless fluid mixer according to this invention are liquids, gases and powders. According to this invention, at least two fluids which are different from each other in characteristics or material quality, such as properties, e.g., viscosity, composition, temperature, color, and particle size can be mixed. In addition to liquid-liquid mixing and gas-gas mixing, liquid-gas mixing, powder-powder mixing, etc., can be carried out. Furthermore, the motionless fluid mixer according to this invention can mix fluids while permitting them to undergo chemical or biochemical reactions. That is, the motionless fluid mixer according to this invention has a wide range of applications from ordinary fluid mixing to gas absorption, dust collection, powder mixing, etc.

Embodiments of this invention will be described below with reference to the accompanying drawings.

DESCRIPTION OF THE MOST PREFERRED EMBODIMENT

Figure 1:
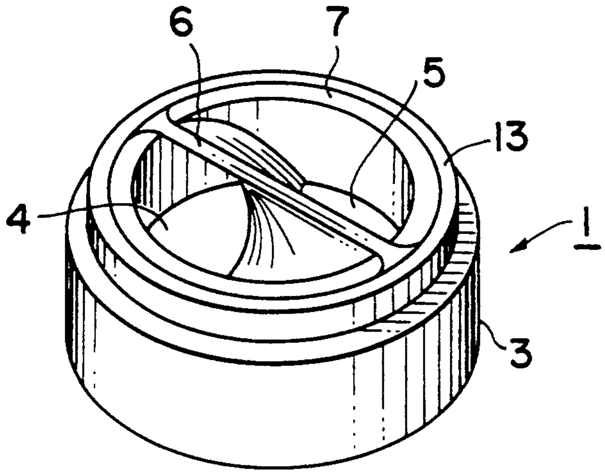
FIG. 1 is a perspective view of a mixing element according to one embodiment of this invention having a helical blade twisted right by 90°.
Figure 2:
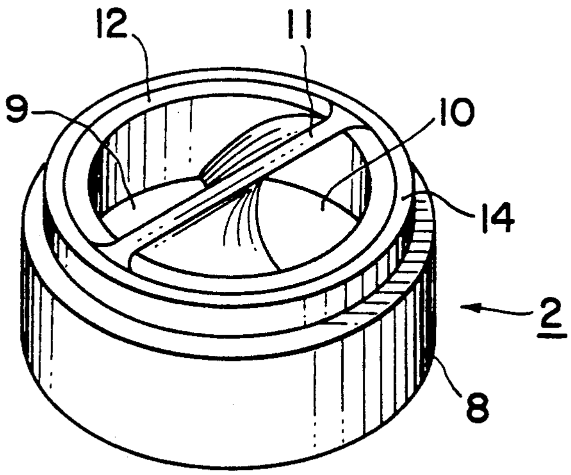
FIG. 2 is a perspective view of the mixing element according to one embodiment of this invention having the helical blade twisted left by 90°.
Figure 3A:
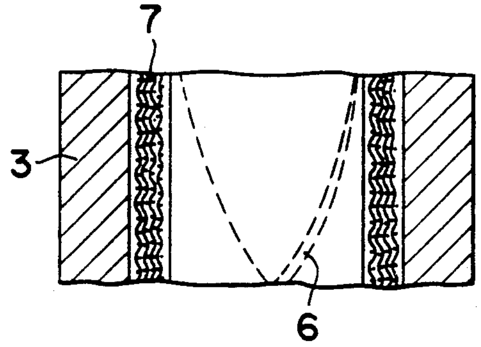
FIGS. 3(*a*)-3(*h*) comprise partial sectional views of various examples of the auxiliary body used in the mixing element of this invention.
Figure 3B:
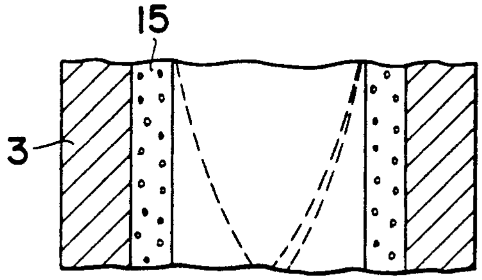
Figure 3C:
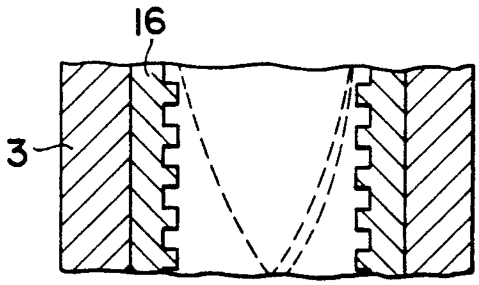
Figure 3D:
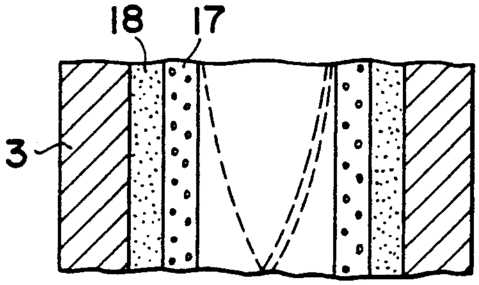
Figure 3E:
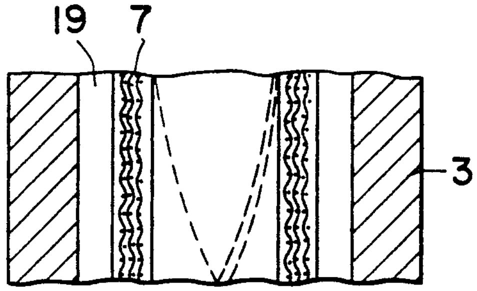
Figure 3F:
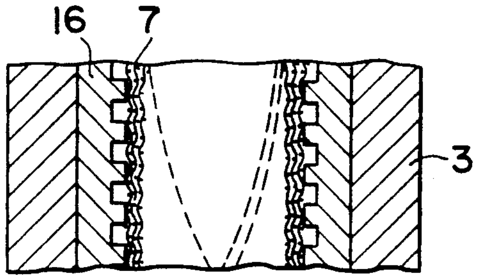
Figure 3G:
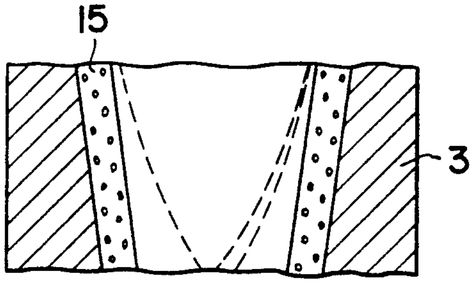
Figure 3H:
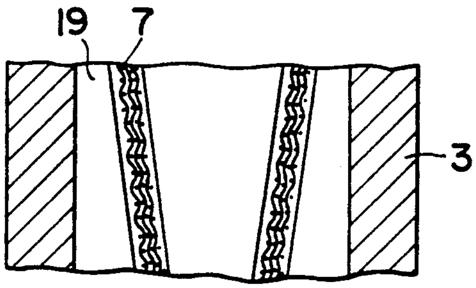

FIGS. 1 and 2 show a mixing element 1 (twisted clockwise) and a mixing element 2 (twisted counterclockwise) respectively, according to this invention.

The mixing element 1 comprises a cylindrical passage tube 3, a helical blade 6 and an auxiliary body 7 which constitute a fluid passage structure in the passage tube 3. The blade 6 is twisted 90° clockwise (to the right) in the longitudinal direction of the flow passage of the passage tube 3 from the inlet end of the passage tube 3 to the outlet end thereof.

The mixing element 2 comprises a cylindrical passage tube 8, a helical blade 11 and an auxiliary body 12 formed in the passage tube 8. The blade 11 is twisted 90° counterclockwise (to the left) in the longitudinal direction of the flow passage of the passage tube 8 from the inlet end of the passage tube 3 to the outlet end thereof.

The passage tubes 3, 8 and the blades 6, 11 may be made of aluminum, stainless steel, ceramics or plastics. The passage tubes 3, 8 and the blades 6, 11 may be formed integrally or may be separately made and later welded or brazed together. The passage tubes 3, 8 and the blades 6, 11 are preferably formed integrally, because this provides the advantage of easier production, and prevents abnormal stagnation of fluids since raised welds, etc. are not formed. It is preferable to round the edges of the blades 6, 11 because the rounded edges decrease the resistance to the flow of fluids. Respective interfaces between the blades 6, 11 and the passage tubes 3, 8 are also rounded so as to prevent abnormal stagnation of fluids at the interfaces.

The passage tubes 3, 8 have inner annular projections 13, 14 and outer annular projections (not shown) formed respectively on both end surfaces for connecting the mixing elements 1, 2. The inner annular projection 13, 14 of one of the mixing elements 1, 2 is inserted in the outer annular projection of the other of the mixing elements 1, 2 to thereby connect a plurality of the mixing elements.

The interior of the passage tube 3 of the mixing element 1 is partitioned by the blade 6 into fluid passages 4, 5. The fluid passages 4, 5 are helically turned clockwise. The interior of the passage tube 8 of the mixing element 2 is partitioned by the blade 11 into flow passages 9, 10. The flow passages 9, 10 are helically turned counterclockwise. The flow passages 4, 5, 9, 10 have semi-arcuate vertical sections over the length of the flow passages-of the passage tubes 3, 8.

As shown in FIG. 3, the auxiliary body 7 in the form of, for example, a meshed body 7 having a certain thickness is provided on the inner wall surface of the passage tube 3. As shown in FIG. 3(*a*), the meshed body 7 may be fixedly secured to the inner wall surface of the passage tube 3 by an adhesive, for example, or it may be secured to the longitudinal ends of the passage tube 3 by fixing means (not shown) which may be, for example, an adhesive. The meshed body 7 may be provided along the blade 6 instead of the inner wall surface of the passage tube 3.

The meshed body 7 has a two- or three-dimensional knitted structure of fibrous plastics, metal, ceramics, glass, carbon, or composite materials thereof. It is especially preferable that metal fiber be sintered after being knitted.

As the auxiliary body used in this invention, various types of materials other than the meshed body 7 of FIG. 3(*a*) can be used. A porous body 15 as shown in FIG. 3(*b*) or a corrugated body 16 as shown in FIG. 3(*c*) may be used. The porous body 15 and the corrugated body 16 can consist of plastics, metal, ceramics, glass, carbon or other materials and are formed by sintering, compaction or other forming methods. It is preferable that the porous body have as many holes as possible for increasing the contact surfaces among a plurality of fluids so as to enhance their mixing effect. In the case where the porous body is made of metal or plastics, it is possible to use foamed metal or foamed plastics. The corrugated body 16 may have the concavities formed in various shapes, e.g., rectangular, triangular, and circular. The porous and the corrugated bodies used in this invention, as in the case with the meshed body, increase their surface areas so as to increase contact areas among a plurality of fluids on the inner wall surface of the passage tube. As a result the mixing efficiency can be improved.

Furthermore, in this embodiment, as shown in FIG. 3(*d*), the auxiliary body can be a finely porous body 18 having fine holes. The finely porous body 18 is secured to the inner wall surface of the passage tube 3, and a porous body 17 having large holes is laid on the inner side of the finely porous body 18. When using the mixing element of this embodiment as a device for removing foreign objects in a gas, an aqueous solution is ejected from a spray nozzle, and the aqueous solution remaining on the porous bodies catches coarse particles in the gas first with the porous body 17 having large perforations, and the fine particles left in the gas are then caught by the finely porous body 18. Accordingly, fine particles of various sizes can be removed from a gas with very high efficiency, whereby this invention is expected to contribute greatly to the efficiency of dust-collecting devices.

As shown in FIG. 3(*e*), the meshed body 7 may be disposed along the inner wall surface of the passage tube 3 with a space 19 therebetween. As shown in FIG. 3(*f*), the corrugated body 16 is secured to the inner wall surface of the passage tube 3, and the meshed body 7 is disposed on the corrugated surface of the corrugated body 16. As shown in FIG. 3(*g*), the inner wall surface of the passage tube 3 is tapered, and to the tapered inner wall surface may be secured the porous body 15 having large perforations may be secured to the wall as an auxiliary body, either singly or as a laminate structure As shown in FIG. 3(*h*), the meshed body 7 (the auxiliary body) which is tapered may be secured to the inner wall surface of the passage tube 3 with the space 19. The use of this invention having the auxiliary body of these structures as a wet dust-collecting device increases the contact area between a gas and a liquid with the result that a higher dust-collecting efficiency can be attained. The use of the mixing element according to this invention in a gas-liquid contact device increases the contact area between a gas and a liquid with the result of improved gas-liquid contact efficiency.

Next, the motionless fluid mixer using a mixing elements 1, 2 according to this invention will be described.

Figure 4:
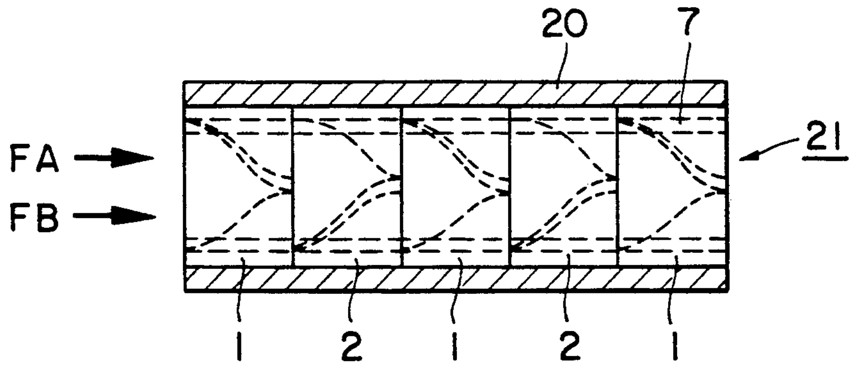
FIG. 4 is a longitudinal sectional view of the motionless fluid mixer comprising a plurality of the mixing elements of this invention connected successively in tandem.

As shown in FIG. 4, a motionless fluid mixer 21 according to this invention comprises clockwise (right-twisted) type mixing elements 1, and counterclockwise (left-twisted) type mixing elements 2 inserted alternately in a row in a pipe 20 and connected by engaging the annular projections 13, 14. In thus connecting the mixing elements 1, 2, they are so arranged that the edges of the blades 6, 11 are orthogonal to each other at the joints therebetween. In the thus fabricated motionless fluid mixer, two kinds of fluids FA and FB are fed into a mixing element 1 at the inlet of the fluid mixer 21 and are turned right helically by 90° respectively along the fluid passages of the mixing element 1 during their flow through the mixing element 1. Then, the fluid FA is divided into flows FA, FA at the joint between the mixing element 1 and a next mixing element 2, and the flows FA, FA respectively join flows FB, FB into which has been divided the fluid FB through the other of the fluid passages. Further, the thus divided and joined flows FA, FB; FA, FB of the fluids are turned left helically by 90° during their passage through a next mixing element 2. Then, the flow through one of the fluid passages of the mixing element 2 is divided at the joint between the mixing element 2 and a next mixing element 1, and the divided flows respectively join flows into which has been divided the flow through the other of the fluid passages. Thus the fluids flow right and left helically through the fluid passages to thereby generate a vortex motion in the fluids. As a result, the fluids are mixed. Furthermore, securing the auxiliary body to the fluid passages increases the contact area between the fluids, and further the fluids are sheared whereby their mixing is enhanced. Thus, the two kinds of fluids FA, FB are caused to repeat the turns, contact, shearing, separation and joining so as to be mixed into a single and homogeneous fluid.

Figure 5:
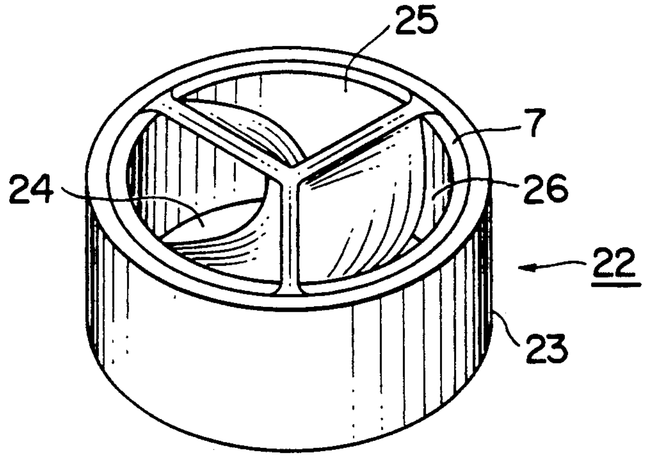
FIG. 5 is a perspective view of the mixing element according to one embodiment of this invention having helical blades twisted right by 90° and having three fluid passages.

FIG. 5 shows a mixing element 22 which is twisted right by 90° and has three fluid passages 24, 25, 26. Compared with the mixing element having only two fluid passages, the mixing element 22 can more efficiently mix more than two kinds of fluids (e.g., 3 kinds of fluids). A mixing element which has been twisted left by 90° (not shown) can provide the same mixing efficiency.

Figure 6:
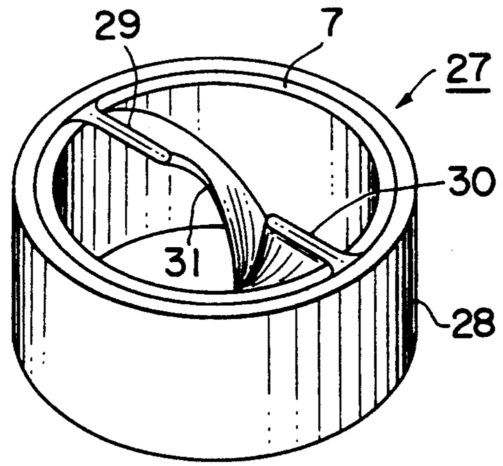
FIG. 6 is a perspective view of the mixing element according to one embodiment of this invention having a helical blade twisted right by 90° and having a longitudinal opening in the helical blade.

FIG. 6 shows a mixing element 27 having blades 29, 30 each with an opening 31 extending from one longitudinal end thereof to the other longitudinal end (in the direction of flow of fluids). The longitudinal opening 31 formed in each blade 29, 30 increases the shearing force exerted on fluids in the diametric and the axial directions of the mixing element 27, and the fluids can be efficiently mixed. The opening 31 may be closed on one end. The opening 31 may be provided in each blade, longitudinally thereof, of the mixing element having three fluid passages of FIG. 6 so as to further improve the mixing efficiency.

Figure 7:
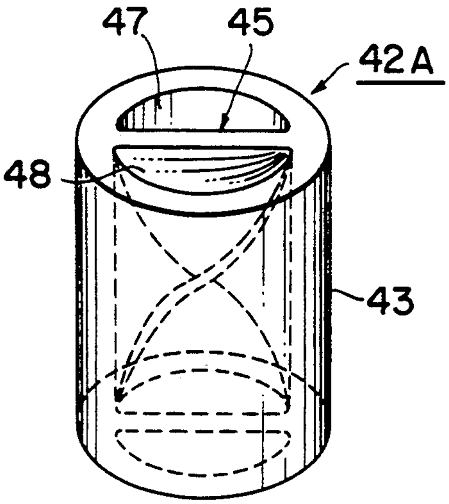
FIG. 7 is a perspective view of the mixing element according to one embodiment of this invention having a blade twisted right or left by 180°.

In fabricating the motionless fluid mixer of this invention by arranging the mixing elements 1, 2, this invention is not limited to alternately connecting the righthand twist-type and the lefthand. Twist-type mixing elements described above with the edge of the blade of one mixing element being orthogonal to that of an adjacent one. For example, a pair of righthand twist type mixing elements can be connected with the edges of their blades parallel to each other, a pair of lefthand twist type mixing elements being connected with the edges of their blades parallel to each other, and both pairs connected to each other with the edges of the blades of one of both pairs being orthogonal to those of the other of both pairs. In this structure, fluids are caused to flow first helically by 180° and then reversely helically by 180°. It is also possible to connect the mixing elements in the sequential order of the righthand twist, lefthand twist, lefthand twist and righthand twist types with the edge of the blade of one of the mixing elements orthogonal of that of an adjacent one. Furthermore, according to this invention, as shown in a mixing element 42A of FIG. 7, the blade may by twisted right or left by 180°. The mixing element 42A comprises a cylindrical passage tube 43, and a helical blade 45 formed in the passage tube 43 longitudinally of the mixing element 42A. The blade 45 is twisted from one end thereof to the other end to the right or the left. The interior of the passage tube 43 of the mixing element 42A is partitioned by the blade 45 into fluid passages 47, 48. The auxiliary body can be disposed on the inner wall surface of the passage tube 43 or on the surface of the helical blade.

Figure 8:
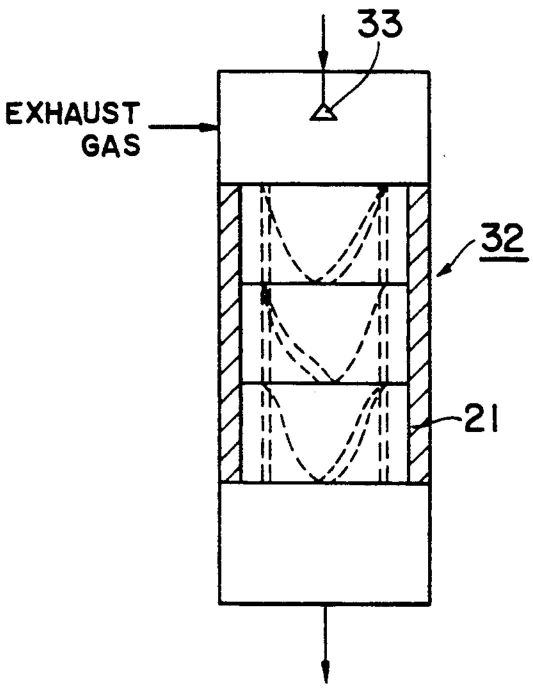
FIGS. 8 through 11 are sectional views of the motionless fluid mixer comprising the mixing elements according to this invention used in various operations.

FIG. 8 shows an embodiment of this invention in which the motionless fluid mixer 21 using the mixing elements having the above-described structures is used as an exhaust gas removing device 32 for removing the fine particles in an exhaust gas. As shown in FIG. 8, an exhaust gas containing fine particles, such as $SiO_2$, chlorine and hydrochloric acid mist is fed into the exhaust gas removing device 32 and caused to flow therethrough while being sprayed with an aqueous solution ejected from the spray nozzle 33. While the exhaust gas and the aqueous solution flow through the mixing elements 1, 2 disposed in the removing device 32, they repeat the separating and joining and the helical flows in opposite directions (reverse turns), so that the gas and the liquid are suitably mixed, and the gas-liquid contact is achieved. The aqueous solution remains on the surfaces of the mesh bodies 7, 12 provided as the auxiliary bodies on the inner wall surfaces of the mixing elements 1, 2, and the aqueous solution remaining thereon and the fine particles in the exhaust gas contact each other. By this contact the .fine particles in the exhaust gas are caught by the aqueous solution and fall in drops together with the-aqueous solution down into a collecting tank (not shown) disposed below the exhaust gas removing device. The chlorine, hydrochloric acid mist, etc. are thus caught in the solution. Thus, drops of the aqueous solution containing the fine particles, chlorine, hydrochloric acid mist, etc. fall into the tank and are stored there. On the other hand, the cleaned exhaust gas from which the the fine particles and mist have been removed is discharged outside by an exhaust blower (not shown).

The exhaust gas removing device having this structure efficiently removes the fine particles, such as dust, contained in exhaust gases. The exhaust gas removing device 32 according to this invention can capture ultra fine particles having a particle diameter equal to or smaller than 1 μm which cannot be captured by conventional exhaust gas removing devices. The exhaust gas removing device according to this invention, which comprises a plurality of the mixing elements connected successively in a row, has a simple structure and can be miniaturized. In addition, its maintenance is easy and is required less frequently than that of conventional devices. The meshed body is laid along the inner wall surface of the passage tube, which results in a small pressure loss in the exhaust gas passing through the mixing elements. Consequently the exhaust blower may have a small capacity. Furthermore, the liquid vs. gas ratio ($l/m^3$) can be increased, which makes simple treatment of high-concentration gas possible, and thus entails lower equipment costs. Furthermore, there is no possibility of trouble due to fine particles, e.g., very tacky $SiO_2$, remaining and growing to clog the exhaust gas removing device.

In the above-described embodiments of this invention, a gas and a liquid flow in the same direction (parallel flow) through the exhaust gas removing device, but it is also possible to cause a gas and a liquid to flow in different directions (opposite or counterflow).

Figure 9:
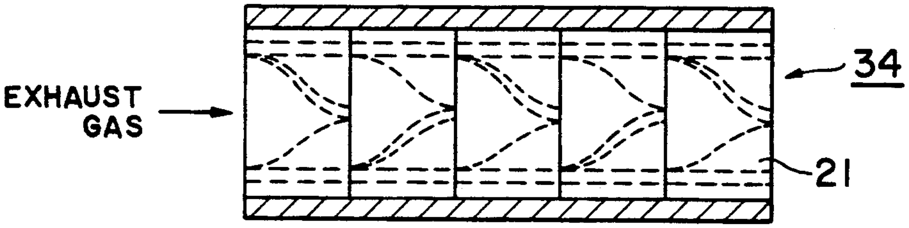

Next, an embodiment of this invention in which mixing elements of this invention are used in an exhaust gas cleaning device of an automobile will be described. As shown in FIG. 9, an exhaust gas cleaning device 34 is provided in an exhaust gas pipe so as to cause exhaust gas to pass through the exhaust gas cleaning device 34. In this case, the blades, the passage tube, and the auxiliary bodies are made of a metal, ceramic, or some other material which has catalytic action. Accordingly, while the exhaust gas is passing through the exhaust gas cleaning device 34, nitrogen oxides (NOx), etc. in the exhaust gas are removed without the flow of the exhaust gas being hindered. Furthermore, it is also possible to remove fine particles, such as carbon, to clean the exhaust gas. It is also possible to make the mixing element of a self-exothermic material so as to burn and remove fine particles, such as carbon. A muffling effect is also produced.

The catalysts carried on the passage tube, the blade and the auxiliary body of this invention are, for example, simple substances of noble metals, such as platinum; metal salts, such as alkali metal salts, alkaline earth metal salts, molybdic acid salts, and formates; and soluble salts of rare earth elements. These metal salts are ordinarily used in aqueous solutions. The passage tube, blade and auxiliary body are immersed in one of these aqueous solutions for a required time and then dried. Alternatively a required quantity of one of these aqueous solutions is applied to the passage tube, blade and auxiliary body by, for example, spraying and is then sintered. In a further alternatively, a metal material is heated, vaporized and deposited, so that fine metal particles are carried on the passage tube, blade and auxiliary body. The passage tube and the blade may be made of a porous material for improved cleaning efficiency.

Figure 10:
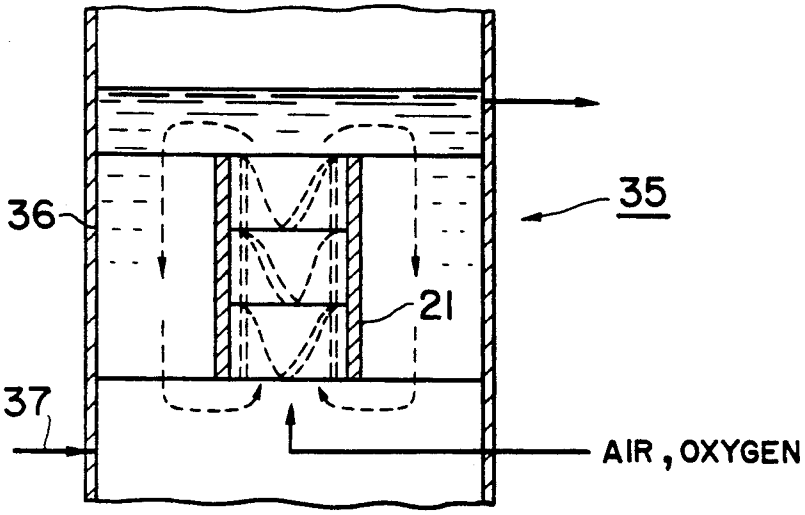

FIG. 10 shows an embodiment of this invention in which mixing elements of this invention are used in a bioreactor 35. As shown in FIG. 10, a fluid mixer 21 for holding bacteria or fixing enzymes is positioned in a reaction tank 36, and a raw liquid 37 is passed through the fluid mixer 21. When aerobic bacteria are fixed for use, air or oxygen is passed together with the raw liquid 37 through the fluid mixer 21.

When organic waste water containing ammonium, etc. is treated by the bioreactor 35, the fluid mixer 21 with the auxiliary body carrying bacteria such as nitrifying bacterium, etc. is placed in a raw liquid to pass the raw liquid through the fluid mixer 21. Ammonium, etc. are efficiently decomposed. A gas, such as air, oxygen or others, for activating the bacteria is passed through the fluid mixer 21. In the fluid mixer 21, bacteria, a raw material, and air or oxygen are amply mixed and contacted with each other, and as a result the organic waste water is cleaned efficiently at low power cost. In applying or fixing enzymes, bacteria, animal or plant tissues, and others which have biochemical catalytic actions, the auxiliary body made of a porous material is immersed in bacteria prepared beforehand so that the auxiliary body adsorbs the bacteria. Otherwise the auxiliary body and bacteria contact each other on the bacteria implanting stage where a reaction starts so that the auxiliary body adsorbs the bacteria in the course of progress of the culture. It is also possible to make the passage tube and the blade of a porous material or the like so that enzymes, bacteria, etc. are carried on or fixed to the passage tube and the blade.

Figure 11:
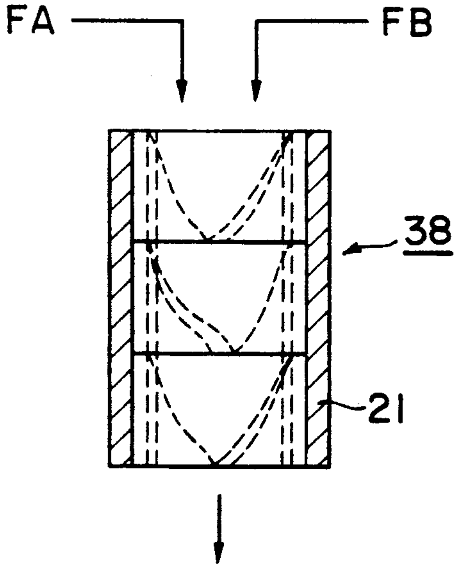

FIG. 11 shows an embodiment of this invention in which mixing elements of this invention are used as a powder mixing device 38. As shown in FIG. 11, two or more kinds of powders are caused to fall freely or forcibly through the mixing device 38. It is preferable to use the auxiliary body 16 having corrugated projections.

As described above, this invention provides a mixing element which produces a large mixing effect and can be easily fabricated. In this invention, a plurality of fluids are mixed with and caused to contact each other with high efficiency during their passage through the passage tube partitioned by the helical blade, and the auxiliary body in the form of meshed body, porous body, etc. is provided on the surface of the blade or the inner wall surface of the passage tube so as to increase the contact area between the fluids and the shearing force. Consequently, for example, the gas-to-liquid contact efficiency is much improved, whereby foreign objects (fine particles, such as dust and mist) in the gas are removed with high efficiency. Also in mixing a plurality of powders, the improved shearing action results in very efficient mixing.

The dimensions of each mixing element, i.e., the diameter, length, etc., the torsion angle of the blade, the intersecting angle between the edges of adjacent blades, the configuration and number of the blades, etc., can be selected as required, and they can be suitably set according to the kinds of fluids and applications of the mixing element. In the above-described embodiments, the structure of the fluid passages is provided by the helical blade partitioning the interior of the passage tube into a plurality of the fluid passages but is not limited thereto. It is possible to form fluid passages suitably shaped for a Reynolds number to work over a long extent for mixing fluids. According to this invention, the structure of the fluid passages may be any as long as it has no mechanical movable parts.

Figure 12:
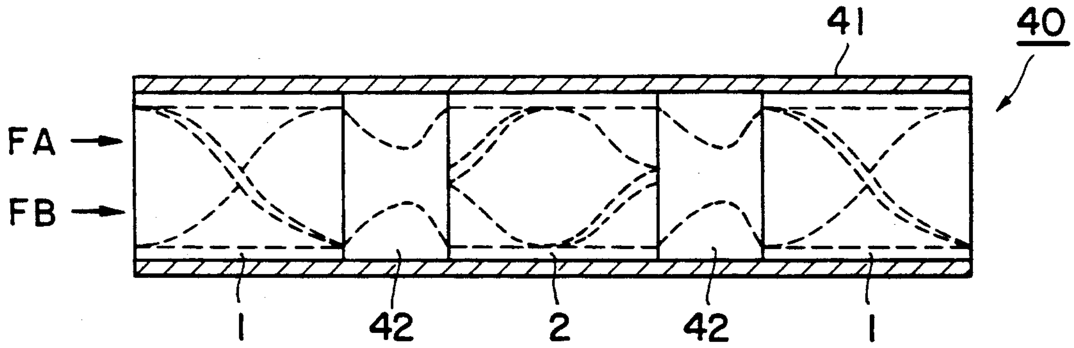
FIG. 12 is a longitudinal section along the fluid passage of the motionless fluid mixer comprising the mixing elements and a spacer interposed therebetween according to this invention.

As shown in FIG. 12, in the motionless fluid mixer of this invention, a spacer 42 having a fluid passage can be inserted in a casing 41 between mixing elements 1, 2. In the fluid mixer having such a structure 40, two kinds of fluids FA, FB are turned helically right by 180° in passing through the mixing element 1, and the fluids FA, FB are joined at the joint between the mixing element 1 and the spacer 42. The joined fluids FA, FB, during their passage through the spacer 42, are joined and converge, and then diverge. The joined fluids are separated at the joint between the spacer 42 and the mixing element 2, and turned helically left by 180°. The two kinds of fluids FA, FB are mixed into a homogeneous fluid while repeating the helical turns, joining, converging, diverging and separating.

Figure 13:
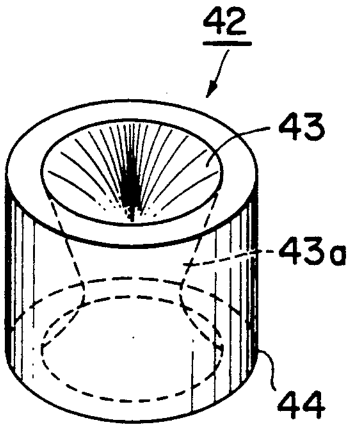
FIG. 13 is a perspective view of the spacer used in the motionless fluid mixer of FIG. 12.

According to this invention, as shown in FIG. 13, the spacer 42 comprises a cylindrical passage tube 44, and a fluid passage 43 formed in the passage tube 44. The fluid passage 43 is continuous from one longitudinal end of the passage tube 44 to the other longitudinal end, and the sectional area of the fluid passage 43 is longitudinally constant or may be varied by providing a constricted throat portion 43*a* in the fluid passage 43. The auxiliary body in the form of the meshed body 7, or some other form may be provided in the passage tube 44 of the spacer 42.

Figure 14:
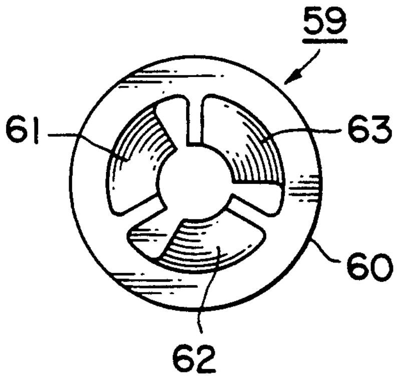
FIG. 14 is a plan view of the spacer having helical blades and having longitudinal openings.
Figure 15:
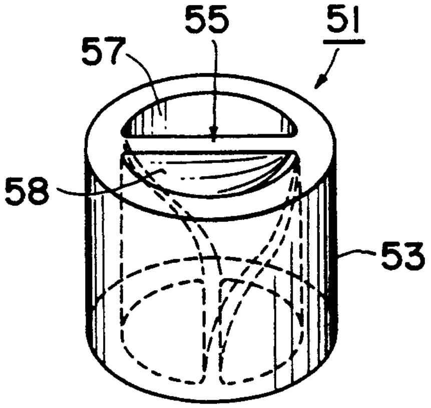
FIG. 15 PRIOR ART
FIG. 15 is a perspective view of a conventional mixing element.

According to this invention, as shown in FIG. 14, three blades 61, 62, 63 are provided within the passage tube 60 of a spacer 59, and openings may be provided in the blades longitudinally of the passage tube 60.

What is claimed is:

1. A mixing element, comprising:

a passage tube having at least one interior wall and longitudinal upstream and downstream ends;

helical blade means directly connected to said at least one interior wall of said passage tube to partition said passage tube into a plurality of physically separate flow passages for separating fluid flowing therethrough into a plurality of separate streams each of which flows through a respective flow passage; and tapered auxiliary body means disposed at least along the walls of said flow passages constituted by the interior walls of said passage tube other than where said helical blade means is connected thereto and being tapered along the entire length of the flow passages for gradually narrowing the cross-section of said passage tube from the upstream to the downstream end, said auxiliary body means having a plurality of large apertures therein for providing a plurality of surfaces for increasing the contact area of a liquid sprayed thereonto with gas being passed through said mixing element, whereby said mixing element can function as a wet dust collecting device.

2. A mixing element as in claim 1, wherein said passage tube has a circular cross-section.

3. A mixing element as in claim 1, wherein said helical blade means extends from one of said longitudinal ends of said passage tube to the other said longitudinal end of said passage tube.

4. A mixing element as in claim 3, wherein said helical blade means twists through an angle of approximately 90°.

5. A mixing element as in claim 3, wherein said helical blade means twists through an angle of approximately 180°.

6. A mixing element as in claim 1, wherein said tapered auxiliary body means is fixed to the interior walls of said passage tube and at least a portion of said helical blade means with fixing means.

7. A mixing element as in claim 6, wherein said fixing means is an adhesive.

8. A mixing element as claimed in claim 1 in which said tapered auxiliary body means is a layer of mesh material.

9. A mixing element as claimed is claim 8 in which said mesh material is spaced from said interior wall.

10. A mixing element as claimed in claim 9 in which said mesh material is spaced inwardly into said passage tube from said interior wall.

11. A mixing element as claimed in claim 1 in which said interior wall is tapered inwardly into said passage tube along the length thereof, and said tapered auxiliary body means is a layer of porous material on said interior wall.

12. A motionless fluid mixer, comprising:

a plurality of mixing elements joined to each other, each of said mixing elements including:

a passage tube having at least one interior wall and longitudinal upstream and downstream ends;

helical blade means directly connected to said at least one interior wall of said passage tube to partition said passage tube into a plurality of discrete flow passages; and tapered auxiliary body means disposed at least along the walls of said flow passages constituted by the interior walls of said passage tube other than where said helical blade means is connected thereto and gradually narrowing the cross-section of said passage tube from the upstream to the downstream end, said auxiliary body means having a plurality of large apertures therein for providing a plurality of surfaces for increasing the contact area of a liquid sprayed thereonto with gas being passed through said mixing element, said passage tubes of said mixing elements being joined in axial alignment into an elongated pipe with the downstream ends being joined to the upstream ends of next succeeding passage tubes, and the helical blades in adjacent mixing elements being twisted in opposite directions, whereby said mixing element can function as a wet dust collecting device.

13. A motionless fluid mixer as claimed in claim 12 in which said tapered auxiliary body means is a layer of mesh material.

14. A motionless fluid mixer as claimed in claim 13 in which said mesh material is spaced from said interior wall.

15. A motionless fluid mixer as claimed in claim 14 in which said mesh material is spaced inwardly into said passage tube from said interior wall.

16. A motionless fluid mixer as claimed in claim 12 in which said interior wall is tapered inwardly into said passage tube along the length thereof, and said tapered auxiliary body means is a layer of porous material on said interior wall.

* * * * *